United States Patent [19]

Bishop

[11] 4,271,863
[45] Jun. 9, 1981

[54] PRESSURE TAPPING

[75] Inventor: Reginald M. Bishop, Ipswich, England

[73] Assignee: Crane Limited, London, England

[21] Appl. No.: 31,959

[22] Filed: Apr. 19, 1979

[30] Foreign Application Priority Data

Apr. 21, 1978 [GB] United Kingdom ............... 15808/78
Dec. 11, 1978 [GB] United Kingdom ............... 47912/78

[51] Int. Cl.³ .................... F16L 37/28; F16L 37/10
[52] U.S. Cl. .............................. 137/557; 137/614.2; 251/149.4; 251/149.6
[58] Field of Search ............. 137/614.2, 557; 251/149.6, 149.4, 149.8

[56] References Cited

U.S. PATENT DOCUMENTS

| Re. 19,087 | 2/1934 | Minor | 137/614.2 |
| 1,221,258 | 4/1917 | Wilson | 137/614.2 |
| 1,317,789 | 10/1919 | Hoar | 137/382.5 |
| 1,318,674 | 10/1919 | Knoll | 251/149.6 |
| 2,385,489 | 9/1945 | Benz | 137/614.2 |
| 2,386,270 | 10/1945 | Samiron | 251/149.6 |
| 3,372,902 | 3/1968 | Göμρπε | —λ— |
| 3,538,950 | 11/1970 | Porteners | 251/149.6 |
| 3,760,842 | 9/1973 | Mikiya | 137/557 |

FOREIGN PATENT DOCUMENTS 582136 8/1933 Fed. Rep. of Germany ........ 251/149.6
655281 7/1951 United Kingdom ................. 137/614.2

Primary Examiner—Martin P. Schwadron
Assistant Examiner—A. Michael Chambers
Attorney, Agent, or Firm—Berman, Aisenberg & Platt

[57] ABSTRACT

A pressure tapping comprises first valve means selectively operable to be in an open or a closed setting, and second valve means connected to an outlet from the first valve means, which second valve means tends to be closed when fluid pressure acts on it from the said outlet, so that accidental leakage of fluid from the pressure tapping, by failure to close the first valve means when the adapter is removed from the pressure tapping, is less likely.

2 Claims, 4 Drawing Figures

PRESSURE TAPPING

This invention relates to a pressure tapping.

Pressure tappings may be used in flow measurement derived from the measurement of differential pressure, and more particularly for flow measurement applications within the field of heating and chilled water circuits.

In a heating or chilled water circuit system there is a need to adjust the fluid flow rate within the various loops of the circuit to achieve predetermined flow conditions. For this purpose flow measuring devices normally in the form of valves each fitted with two pressure tappings on respective sides of a valve closure member are included in the circuit. Measurement of flow through a given valve is typically achieved by attaching a differential type manometer to the pressure tappings on the valve and converting the differential reading thus obtained into a flow measurement by means of a calibration chart.

A variety of pressure tappings have so far been proposed. One tapping takes the form of a ball check valve to which a manometer adaptor is coupled when flow measurement is required. Unfortunately, some leakage may occur during connection, and also the ball may fail to re-seat correctly, for example because of grit or dirt, after disconnection of the manometer adaptor.

Another pressure tapping which has been proposed comprises a needle valve. This is not so subject to the problems of the ball check valve tapping, but leakage can occur on disconnection of the manometer adaptor if the operator forgets to close the needle valve prior to the disconnection.

An aim of the present invention is to provide a pressure tapping with a reduced likelihood of leakage. With this aim in view, the present invention is directed to a pressure tapping comprising first valve means, selectively operable to be in an open or a closed setting, and second valve means, connected to an outlet from the first valve means, which second valve means tends to be closed when fluid pressure acts on it from the said outlet, so that accidental leakage of fluid from the pressure tapping, by failure to close the first valve means when an adaptor is removed from the pressure tapping, is less likely.

An example of a pressure tapping in accordance with the present invention is illustrated in the accompanying drawings, in which.

Figure 1:
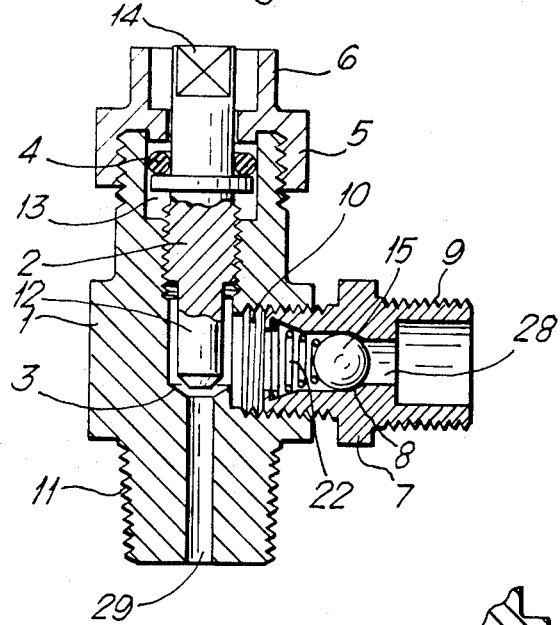
FIG. 1 is an axial sectional view of the tapping.

With reference to FIG. 1, a needle valve 1 of the pressure tapping has a body with an externally screw-threaded portion 11 for engagement with an internally screw-threaded part of a pipe, valve or orifice device (not shown) the interior fluid pressure of which is to be measured by the pressure tapping. Closure of the needle valve is effected by means of a needle 12 on a stem 2, a coned end of the needle 12 being designed to engage a conically formed seating 3 in the valve body. The stem 2 is screw-threaded and rotatable for this purpose. Fluid leakage past the needle valve stem 2 is prevented by means of an O-ring seal 4 housed in an enlarged bore 13 at an upper end of the valve body and retained by a cap 5. The cap carries a cylindrical extension 6 proportioned to inhibit access to a squared end 14 of the stem 2, to form a lockshield. Thus a standard radiator key is required to open or close the needle valve, where both the size of the square hole in the key and the outside diameter of the key match the dimensions of the stem square and lockshield bore respectively.

Figure 3:
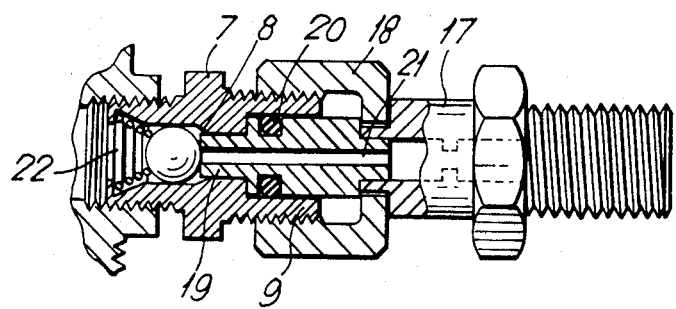
FIG. 3 is an axial sectional view of the part shown in FIG. 2 together with an adaptor.

A ball check valve 7 is screwed into an outlet 10 from the needle valve 1. Thus the ball check valve is arranged in such a manner that it would contain fluid pressure in the outlet 10 by virtue of such pressure maintaining a non-corrodible ball 15 in intimate contact with a cone seating 8 formed within the ball check valve body. A biasing spring 22 also urges the non-corrodible ball 15 against the cone seating 8 so that the ball check valve tends to be closed. An externally screw-threaded extension 9 is provided on the ball check valve for attachment of a probe type adaptor 17 (see FIG. 3) to connect the pressure tapping to a pressure measuring device (not shown). Such attachment is facilitated by an outlet bore 28 of the ball check valve 7 being perpendicular to an inlet bore 29 of the needle valve. This screw-threaded extension 9 has an internal machined bore diameter appropriate for receiving an O-ring seal 20 or other form of seal of the probe type adaptor.

Figure 2:
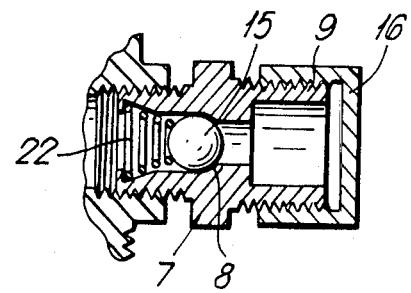
FIG. 2 is an axial sectional view of a part of the tapping shown in FIG. 1, together with a cap.

In FIG. 2, the ball check valve 7 is shown provided with a dust cap 16 screwed onto the extension 9.

In use, the pressure tapping is permanently connected to a pipe, valve or orifice device the interior fluid pressure of which is to be measured by means of the pressure tapping. Pressure in the pipe, valve or orifice device would be contained by closure of the needle valve 1. In the event of inadvertent failure to close the needle valve 1 on removal of an adaptor, pressure would be contained by virtue of the ball 15 being pushed against the seating 8. Under the latter condition any leakage across the seating 8 due to dirt could be readily stopped by closure of the needle valve 1.

Referring again to FIG. 3, connection of the pressure tapping to a pressure measuring device (not shown) is made by inserting a probe type adaptor 17, itself connected to the measuring device, into the extension 9. The adaptor 17 has the seal 20 which makes an effective seal within the machined bore of the extension 9 as a probe 19 of the adaptor 17 is moved into the ball check valve 2 to dislodge the ball 15 from its seat 8 against the force of the spring 22. This movement is brought about by rotation of an internally screw-threaded ring 18 on the externally screw-threaded extension 9. Fluid pressure is then communicated to the pressure measuring device, via a bore 21 in the probe 19, by opening the needle valve 1.

Disconnection of the adaptor 17 from the pressure tapping should be preceded by closure of the needle valve 1. If, however, the needle valve 1 is inadvertently left open when the adaptor 17 is disconnected, there will be little or no leakage through the tapping because of the self-sealing action of the ball check valve 7.

If the pressure measuring device is a mercury filled manometer, the probe type adaptor may itself be fitted with a spring loaded ball check valve to reduce the likelihood of accidental loss of mercury when the adaptor is removed from the pressure tapping. The spring 22 is present to overcome the spring loading of the adaptor ball check valve when the adaptor is connected to the pressure tapping.

Figure 4:
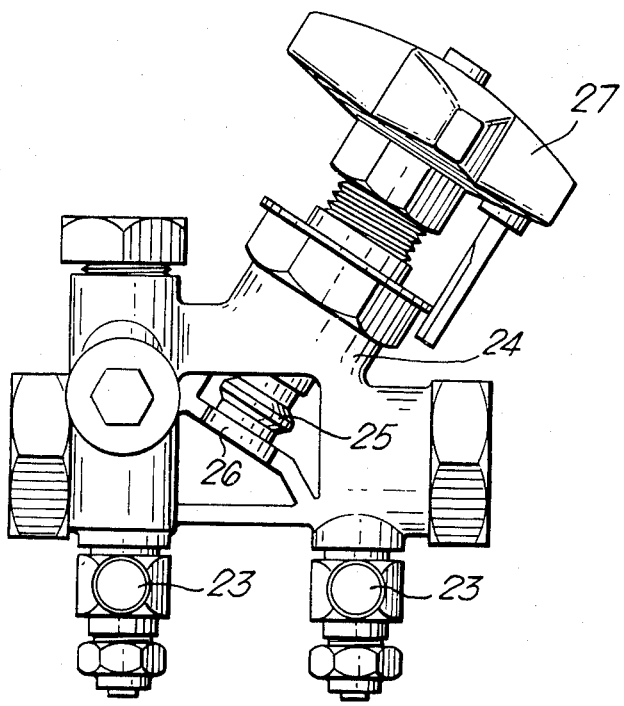
FIG. 4 shows a side, partly cut away view of a balancing valve with two pressure tappings each of which is an example of the present invention.

FIG. 4 shows two pressure tappings 23, each like the one shown in FIG. 1, fitted to a balancing valve 24. A manually operable knob 27 of the balancing valve can be rotated to move a plug disc 25 against a seating 26 to close the valve, or away from the seating to open it. The presence of a tapping on both sides of the seating 26 enables the pressure differential across the seating to be measured by a manometer. From the pressure differential, a calibration chart will give the fluid flow rate through the balancing valve required to give that differential.

The adaptor 17 may be a proprietary probe type adaptor.

In the illustrated tapping, a globe valve or a plug valve could be used in place of the needle valve, and the ball check valve could be replaced by a disc valve.

The use of two pressure tappings to measure the flow rate through a balancing valve, as illustrated, could be applied to measure the flow rate through an orifice device.

I claim:

1. In combination, a fluid pressure tapping and a probe-type adaptor releasably connected thereto, said fluid pressure tapping comprising a valve body, an inlet portion of said valve body, an external screwthread around the periphery of said inlet portion, a fluid inlet bore extending through said inlet portion coaxially with said external screwthread, said bore being small in cross section in relation to said inlet portion, an internal end of said fluid inlet bore within said valve body, a conical seating at said internal end, an internal screwthread within said valve body spaced from said internal end of said inlet bore, a cavity within said valve body between said internal screwthread within the valve body and said internal end of said inlet bore, a singe-piece elongate closure member extending into the valve body, an external screwthread around said closure member engaging said internal screwthread within said valve body, an internal end portion of said closure member extending into said cavity, a conical tip of said internal end portion to permit sealing engagement of said closure member with said conical seat, an external end portion of said closure member projecting from said valve body, at least one lateral face made on said external end to permit the latter to be held and turned, whereby said closure member is selectively operable between an open setting in which said conical tip is spaced from said conical seat, and a closed setting in which said tip and said seat are in sealing engagement, to control and shut off respectively fluid flow through said fluid inlet bore into said cavity, said tapping further comprising a shield portion connected to said valve body and surrounding said external end portion to prevent inadvertent turning of said closure member attached to said valve body, connector means including a passageway in said connector means in communication with said cavity in said valve body, a ball check-valve in said connector means the ball of which is arranged to be urged into a closed position by fluid pressure acting on said ball from said cavity to stop fluid flow through said passageway in said connector means, a frustoconical spring located in said passage in said connector means and acting on said ball check-valve to urge said ball check-valve to a closed position, an annular flange on said connector means projecting into said passage of said connector means to form an abutment for an end of said coil spring whereby to hold said spring against undesired release from said connector means, a smooth cylindrical, seal-receiving bore in said connector means located downstream of said ball check-valve means to form an outlet end portion of said passageway in said connector means, an internal annular shoulder within said connector means at an internal end of said seal-receiving bore to form a stop for a probe-type adaptor when the latter has been inserted into the connector means to the correct extent, and external screwthreading on said connector means; said probe-type adaptor comprising: a probe movable in said passageway of said connector means to open said ball check-valve in said connector means, a shoulder on said probe which abuts said shoulder within the connector means, a ring rotatably carried on said probe, an internal screwthread on said ring in engagement with said external screwthreading of said connector means, and a sealing member carried by said probe to make internal contact with said seal-receiving bore, said probe-type adaptor including a bore, whereby said adaptor opens said ball check-valve to allow fluid flow from said inlet bore through said probe-adaptor bore when said valve body is open.

2. The combination as in claim 1 wherein said combination further includes:
(a) a fluid balancing valve means comprising a valve body, a passage in said valve body to allow fluid to flow therethrough, aperture defining means in said passage, and said valve means selectively varying the opening of said aperture defining means;
(b) two fluid pressure tappings each connected to said balancing valve to be in fluid communication with said passage in said valve body of said balancing valve respectively on opposite sides of said aperture defining means so as to allow the pressure differential across said balancing valve means to be measured, said adaptor including pressure measuring means, wherein the flow rate through said balancing valve means can be determined from said pressure differential.

* * * * *